(12) United States Patent
Park et al.

(10) Patent No.: US 11,523,024 B2
(45) Date of Patent: Dec. 6, 2022

(54) EMBEDDING USER SPECIFIC INFORMATION INTO USER SPECIFIC INFORMATION INPUT AREA OF DOCUMENT

(71) Applicant: Hewlett-Packard Development Company, L.P., Spring, TX (US)

(72) Inventors: Incheon Park, Seongnam-si (KR); Daehyun Kim, Seongnam-si (KR); Jaein Lee, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/281,643

(22) PCT Filed: Oct. 18, 2019

(86) PCT No.: PCT/US2019/056943
§ 371 (c)(1),
(2) Date: Mar. 31, 2021

(87) PCT Pub. No.: WO2020/219097
PCT Pub. Date: Oct. 29, 2020

(65) Prior Publication Data
US 2021/0377420 A1 Dec. 2, 2021

(30) Foreign Application Priority Data

Apr. 24, 2019 (KR) .......................... 10-2019-0047984

(51) Int. Cl.
*H04N 1/32* (2006.01)
*H04N 1/00* (2006.01)

(52) U.S. Cl.
CPC ....... *H04N 1/32229* (2013.01); *H04N 1/0044* (2013.01); *H04N 1/32133* (2013.01); *H04N 1/32304* (2013.01)

(58) Field of Classification Search
CPC .......... H04N 1/32229; H04N 1/32133; H04N 1/32304; H04N 1/0044; H04N 1/00411;
(Continued)

(56) References Cited

U.S. PATENT DOCUMENTS 7,936,467 B2    5/2011   Shimizu
7,965,401 B2    6/2011   Ishimaru
(Continued)

FOREIGN PATENT DOCUMENTS

| JP | 2018-45705 A | 3/2018 |
|---|---|---|
| KR | 10-2006-0085371 A | 7/2006 |
| KR | 10-2016-0099824 A | 8/2016 |

*Primary Examiner* — Chad Dickerson
(74) *Attorney, Agent, or Firm* — Jefferson IP Law, LLP

(57) ABSTRACT

An example image forming apparatus includes a user interface device, an image forming job operator, a processor, and a memory. The processor executes instructions to display a preview screen of a document through the user interface device, perform an embedding process of embedding user-specific information into a plurality of user-specific information input areas included in the document, display state information of the plurality of user-specific information input areas on the preview screen in synchronization with progress of the embedding process, and, when the embedding process is completed, perform an image forming job with respect to the document in which the user-specific information is embedded, through the image forming job operator.

20 Claims, 11 Drawing Sheets

(58) Field of Classification Search
CPC .......... H04N 1/00392; H04N 1/32144; H04N 2201/3205; H04N 2201/3203; H04N 2201/3245; H04N 1/00477; G06Q 10/063114; G06F 3/04895; G06F 3/0481; G06F 40/174
USPC ...... 358/1.11–1.18, 3.28; 715/221, 224, 225, 715/705, 710, 772
See application file for complete search history.

(56) References Cited

U.S. PATENT DOCUMENTS

| | | | |
|---|---|---|---|
| 9,350,553 B1 | 5/2016 | Sakkos et al. | |
| 2004/0100669 A1* | 5/2004 | Tecu | H04N 1/121 |
| | | | 358/1.18 |
| 2004/0199862 A1* | 10/2004 | Kobayashi | H04N 1/44 |
| | | | 715/274 |
| 2005/0094192 A1* | 5/2005 | Harris | G06Q 10/10 |
| | | | 358/1.15 |
| 2005/0231746 A1* | 10/2005 | Parry | H04N 1/00355 |
| | | | 358/1.13 |
| 2006/0279810 A1* | 12/2006 | Momose | H04N 1/00427 |
| | | | 358/518 |
| 2008/0151301 A1 | 6/2008 | Ito | |
| 2009/0128859 A1* | 5/2009 | Daos | H04N 1/32203 |
| | | | 358/3.28 |
| 2009/0164791 A1 | 6/2009 | Lee et al. | |
| 2014/0137216 A1* | 5/2014 | Mohler | H04L 9/32 |
| | | | 726/5 |
| 2017/0147267 A1 | 5/2017 | Yanagi | |
| 2018/0343363 A1 | 11/2018 | Tagaki | |
| 2019/0034403 A1* | 1/2019 | Pal | G06F 40/194 |

* cited by examiner

| | | | | | | | Sign |
| --- | --- | --- | --- | --- | --- | --- | --- |
| | | | | | | | Select |
| | | | | | | | Delete |
| | | | | | | | Delete All |

- Total (6) Sign (0) Remains (6) Selected (4)

STATE INFORMATION OF USER-SPECIFIC INFORMATION INPUT AREAS

| | | ADDRESS | | | | | |
| --- | --- | --- | --- | --- | --- | --- | --- |
| SELLER | | SOCIAL SECURITY NUMBER | | PHONE NUMBER | | NAME | (SEAL) |
| | AGENT | ADDRESS | | SOCIAL SECURITY NUMBER | | NAME | |
| BUYER | | ADDRESS | | | | | |
| | | SOCIAL SECURITY NUMBER | | | | NAME | (SEAL) |
| | AGENT | ADDRESS | | SOCIAL SECURITY NUMBER | | NAME | |
| | | ADDRESS OF OFFICE | | NAME OF OFFICE | | | |
| BROKER | REPRESENTATIVE | SIGNATURE·SEAL | (SEAL) | SIGNATURE·SEAL | (SEAL) PHONE NUMBER | | |
| | REGISTRATION NUMBER | | PHONE NUMBER | REGISTRATION NUMBER | | | |
| | ASSIGNED LICENSED REAL ESTATE AGENT | SIGNATURE·SEAL | (SEAL) | SIGNATURE·SEAL | (SEAL) | | |

USER-SPECIFIC INFORMATION INPUT AREA

User 1  User 2

Options  × ◇ Send

Scan to Email

PREVIEW SCREEN

FIG. 11

EMBEDDING USER SPECIFIC INFORMATION INTO USER SPECIFIC INFORMATION INPUT AREA OF DOCUMENT

BACKGROUND

A user interface device included in an image forming apparatus such as a printer, a photocopier, a fax machine, a multifunctional machine, or the like has been provided in various forms to enhance a user convenience. A user interface device of an image forming apparatus is being developed to provide a convenient and user-friendly user interface (UI) or user experience (UX) to a user.

BRIEF DESCRIPTION OF DRAWINGS

FIG. 7 is a diagram of a user interface screen through which a user-specific information input area may be selected, according to an example;

FIG. 8 is a diagram of a user interface screen through which user specific information may be embedded into a plurality of user-specific information input areas, according to an example;

FIG. 11 is a diagram of a user interface screen through which user specific information may be embedded into a plurality of user-specific information input areas, according to an example.

DETAILED DESCRIPTION OF EXAMPLES

Figure 1:
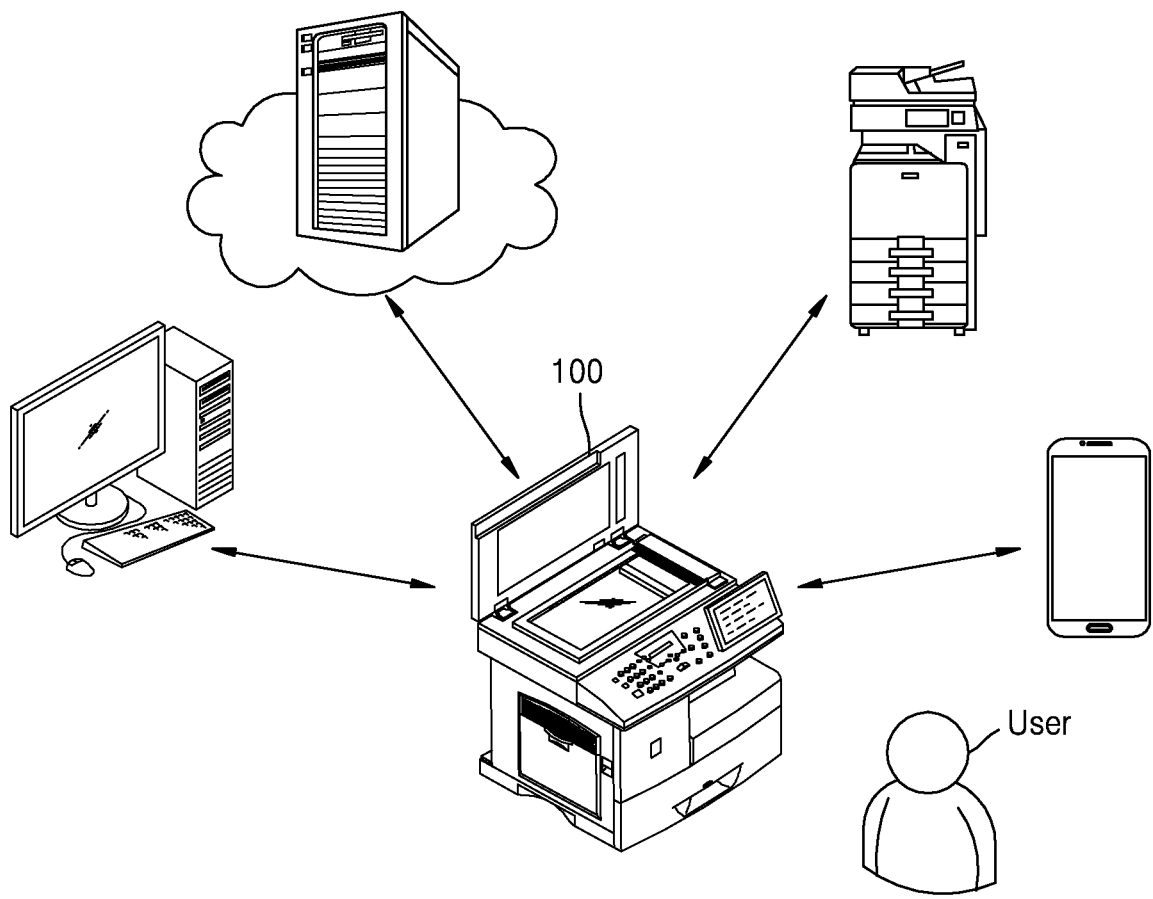
FIG. 1 is a diagram of an image forming job environment of an image forming apparatus including an image forming apparatus and external apparatuses connected to the image forming apparatus, according to an example.

Hereinafter, various examples will be described with reference to the drawings. Like reference numerals in the drawings denote like elements, and thus a repetitive description may be omitted.

FIG. 1 is a diagram of an image forming job environment of an image forming apparatus including an image forming apparatus and external apparatuses connected to the image forming apparatus, according to an example.

Referring to FIG. 1, an image forming apparatus 100 may be a printer, a photocopier, a scanner, a facsimile, a multi-functional machine, or the like, and may perform an image forming job such as printing, copying, scanning, or faxing. Depending on a type of the image forming apparatus 100, the image forming apparatus 100 may form an image on a recording medium such as a printing paper by any of various methods.

The image forming apparatus 100 may be connected to an external device and may transmit or receive information to/from the external device. The external device may be a computer, a Cloud based device, a server, another image forming apparatus, a mobile device such as a smartphone, or the like.

A user of the image forming apparatus 100 may access the image forming apparatus 100 and execute functions of the image forming apparatus 100. The user may input user account information to the image forming apparatus 100 to log in and use the image forming apparatus 100. The user may operate the image forming apparatus 100 by editing a document in a user interface screen provided by the image forming apparatus 100 or by setting options related to an image forming job.

When a document includes a contract, an agreement between users, or the like, an input of user-specific information may be required in various places in the document. In this case, the user may want to input the user-specific information in the various places in an easy and convenient manner such that any place where the user-specific information is required to be input is not missed. Hereinafter, example operations of collectively inputting user-specific information in various places in a document by using a user interface screen provided by an image forming apparatus will be described.

Figure 2:
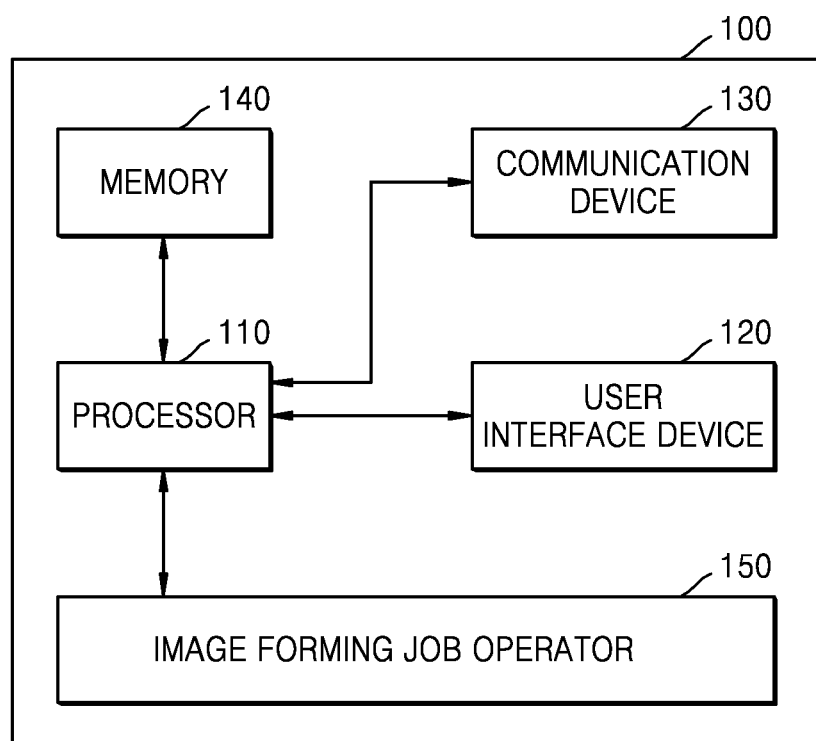
FIG. 2 is a block diagram of an image forming apparatus according to an example.

FIG. 2 is a block diagram of an image forming apparatus according to an example.

Referring to FIG. 2, the image forming apparatus 100 may include a processor 110, a user interface device 120, a communication device 130, a memory 140, and an image forming job operator 150. Although not illustrated, the image forming apparatus 100 may further include other elements, such as a power supply unit to supply power to the image forming apparatus 100 or to various components of the image forming apparatus 100 (e.g., the processor 110, the user interface device 120, the communication device 130, the memory 140, or the image forming job operator 150).

The processor 110 may control an operation of the image forming apparatus 100 and may include at least one processing unit such as a central processing unit (CPU) or the like. The processor 110 may control other components included in the image forming apparatus 100 to perform an operation corresponding to a user input received through the user interface device 120. The processor 110 may respectively include a specialized processing unit corresponding to each function of the image forming apparatus 100, a single processing unit for processing all functions of the image forming apparatus 100, or a combination thereof. The processor 110 may execute a program stored in the memory 140, read data or files stored in the memory 140, or store new data in the memory 140.

The user interface device 120 may include an input unit and an output unit. In an example, the input unit may receive, from the user, an input for performing an image forming job and the output unit may display a result of performing the image forming job or information of a state of the image forming apparatus 100. For example, the user interface device 120 may be in the form of a touch screen including an operation panel to receive a user input and a display panel to display a screen.

The communication device 130 may perform wired or wireless communication with another device or a network. To this end, the communication device 130 may include a communication module (e.g., a transceiver) supporting at least one of various wired or wireless communication methods. The wireless communication may include, for example, wireless fidelity (Wi-Fi), Wi-Fi direct, Bluetooth, ultra wideband (UWB), near field communication (NFC), or the like. The wired communication may include, for example, Ethernet, universal serial bus (USB), high definition multimedia interface (HDMI), or the like.

The communication device 130 may be connected to an external device located outside the image forming apparatus 100 to transmit and receive signals or data. The communication device 130 may transmit signals or data received from the external device to the processor 110 or transmit signals or data generated by the processor 110 to the external device.

The memory 140 may store instructions executable by the processor 110. The memory 140 may store programs and files like applications corresponding to respective functions of the image forming apparatus 100. The memory 140 may store an operating system.

The image forming job operator 150 may perform an image forming job such as printing, copying, scanning, or faxing. The image forming job operator 150 may perform an image forming job according to a command received by a user input through the user interface device 120. The image forming job operator 150 may form an image on a recording medium by any of various printing methods such as an electrophotographic method, an inkjet method, a thermal transfer method, a direct thermal method, or the like, according to a printing function. The image forming job operator 150 may read a recorded image by irradiating light onto an original and receiving reflected light according to a scanning function. The image forming job operator 150 may scan an image and transmit a scan file to a destination or receive a file from an external source and print the received file, according to a faxing function.

The image forming apparatus 100 may use the user interface device 120 to communicate with a user such as by receiving a request from the user or providing information to the user. The image forming apparatus 100 may also communicate with the user by use of an external device such as a user terminal through the communication device 130.

The processor 110 may execute instructions stored in the memory 140 to display a preview screen of a document through the user interface device 120 and perform an embedding process of embedding user specific information into a plurality of user-specific information input areas included in the document. The processor 110 may execute instructions stored in the memory 140 to display state information of the plurality of user-specific information input areas on the preview screen in synchronization with a progress of the embedding process. The state information of the plurality of user-specific information input areas may be adaptively changed in synchronization with selection of the user-specific information input areas or an embedding of the user-specific information. The processor 110 may execute instructions stored in the memory 140 to perform an image forming job with respect to the document in which the user-specific information is embedded through the image forming job operator 150 when the embedding process is completed. The user-specific information may be stored for each user in the memory 140, such as during performance of the embedding process, or may be deleted from the memory 140 when the image forming job is finished.

The processor 110 may execute instructions stored in the memory 140 to receive an input of user-specific information from the user and store the input user-specific information. The processor 110 may execute instructions stored in the memory 140 to receive an input selecting the plurality of user-specific information input areas to be input with the user-specific information in the document displayed on the user interface device 120 and embed the stored user-specific information into the plurality of selected user-specific information input areas according to a request of the user.

The processor 110 may execute instructions stored in the memory 140 to receive an input selecting the plurality of user-specific information input areas to be input with the user-specific information in the document displayed on the user interface device 120. The processor 110 may execute instructions stored in the memory 140 to receive an input of user-specific information from the user and embed the received user-specific information into the plurality of selected user-specific information input areas according to a request of the user.

The processor 110 may execute instructions stored in the memory 140 to identify the plurality of user-specific information input areas in the document displayed on the user interface device 120 and receive an input selecting at least one user-specific information input area to be input with the user-specific information among the plurality of identified user-specific information input areas. The processor 110 may execute instructions stored in the memory 140 to receive an input of user-specific information from the user and embed the received user-specific information into at least one of the plurality of selected user-specific information input areas according to a request of the user.

The processor 110 may execute instructions stored in the memory 140 to edit the user-specific information embedded into the plurality of user-specific information input areas on the preview screen.

An example operation of an image forming apparatus will now be described. The above-mentioned contents with respect to the image forming apparatus 100 may be applied to an operation method of an image forming apparatus as the same even when the contents are omitted hereinafter. Alternatively, the contents of the operation method of the image forming apparatus may be applied to the image forming apparatus 100 as the same.

Figure 3:
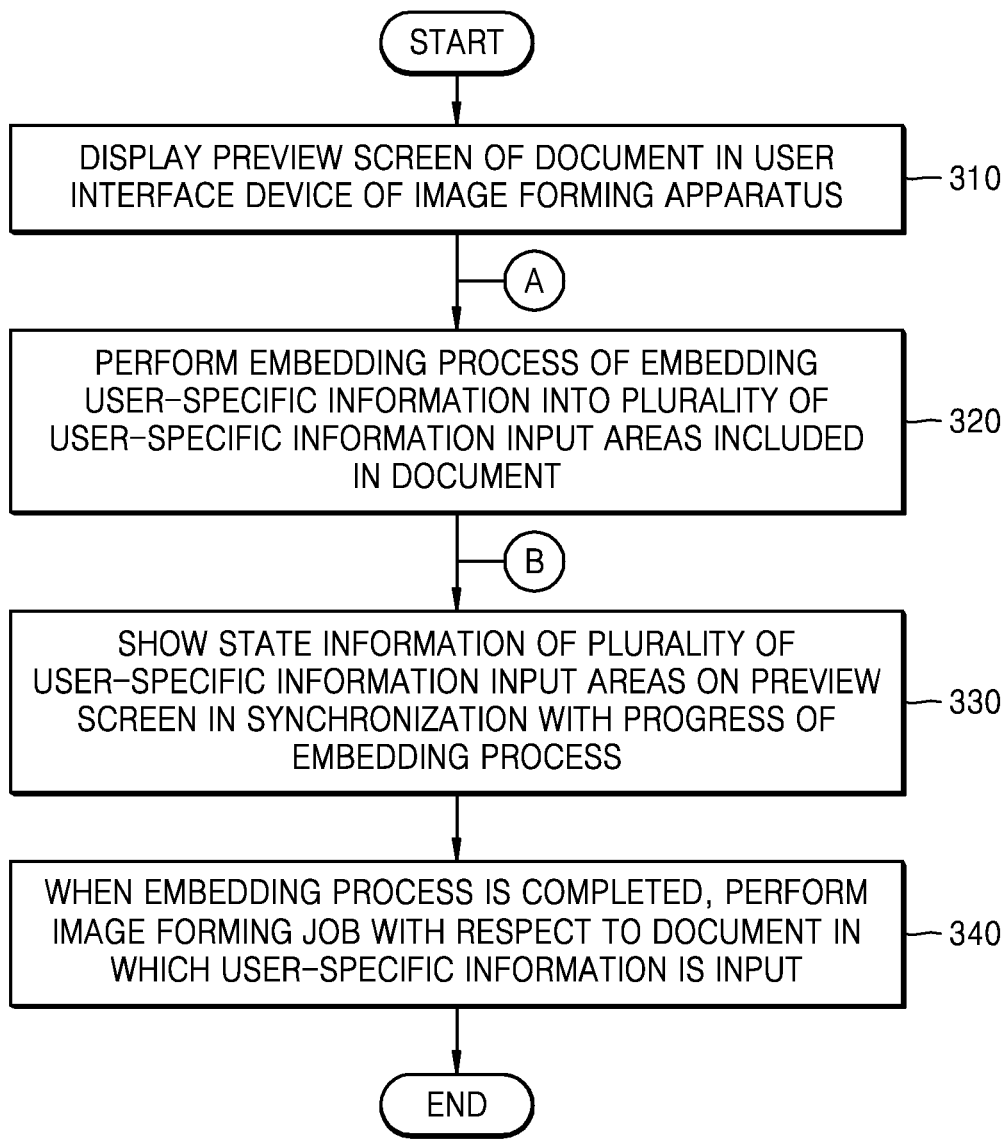
FIG. 3 is a flowchart of an operation method of an image forming apparatus, according to an example.

FIG. 3 is a flowchart of an operation method of an image forming apparatus according to an example.

Referring to FIG. 3, the image forming apparatus 100 may display a preview screen of a document on the user interface device 120 in operation 310. In an example, the image forming apparatus 100 may display a document received from an external source, a scanned document stored in the image forming apparatus 100, or the like on the preview screen.

In operation 320, the image forming apparatus 100 may perform an embedding process of embedding user specific information into a plurality of user-specific information input areas included in a document. The user-specific information may include information having different contents for each user such as a signature (e.g., a signed name, a graphic, etc.), a seal, a social registration number, or the like. In other examples, the user-specific information may include user personal information such as an email address, a phone number (e.g., a mobile phone number), or the like. The image forming apparatus 100 may designate the plurality of user-specific information input areas included in the document through selection by the user or automatic identification. As an example, an optical character recognition (OCR) or an intelligent character recognition (ICR) technology may be used to perform automatic identification of the plurality of user-specific information input areas. The image forming apparatus 100 may receive an input of user-specific information through the user interface device 120 or an external apparatus connected to the image forming apparatus 100. The user-specific information may be stored for each user in the memory 140 in the image forming apparatus during the embedding process. According to a request of the user, the received user-specific information may be collectively embedded into the plurality of designated user-specific information input areas.

The embedding process may further include an operation of editing the user-specific information embedded into the plurality of user-specific information input areas on the preview screen. For example, the user may perform editing of the user-specific information by actions such as deleting, color changing, position moving, size adjusting, or the like of the user-specific information in the image forming apparatus 100.

When embedding of the user-specific information of a same user is further required, the user may further designate the user-specific information input area through the image forming apparatus 100 to embed the user-specific information. On the other hand, when embedding of the user-specific information of another user is required, an embedding process including input of user-specific information, a designation of the user-specific information input area, and an embedding of the user-specific information into the user-specific information input area may be performed.

In operation 330, the image forming apparatus 100 may display state information of the plurality of user-specific information input areas on the preview screen in synchronization with a progress of the embedding process. The state information of the plurality of user-specific information input areas may be adaptively changed in synchronization with selection of the user-specific information input areas or an embedding of the user-specific information. The state information of the plurality of user-specific information input areas may be at least one of a total number of the plurality of user-specific information input areas, a number of the user-specific information input areas selected by the user, a number of user-specific information input areas into which the user-specific information is embedded, a number of user-specific information input areas into which the user-specific information is not embedded, or the like.

In operation 340, the image forming apparatus 100 may perform an image forming job with respect to a document into which the user-specific information is embedded when the embedding process is completed. The image forming apparatus 100 may determine that the embedding process is completed when the user-specific information input areas to be embedded with the user-specific information no longer exist or there is a user's termination request with respect to the embedding process. For example, in a case where the user-specific information is applied to all of the user-specific information input areas or the user-specific information is applied to some of the user-specific information input areas and the remaining user-specific information input areas are deselected, or in a case where all of the user-specific information input areas are deselected, the image forming apparatus 100 may determine that no user-specific information input area omitting the user-specific information exists (e.g., that all user-specific information input areas have been considered).

When the embedding process is completed, the image forming apparatus 100 may store or print the document into which the user-specific information is embedded. As an example, the image forming apparatus 100 may store the document in the memory 140 or in an external storage device. Also, the image forming apparatus 100 may transmit the document to an external apparatus through a service such as e-mail, File Transfer Protocol (FTP), Server Message Block (SMB), or the like. When the image forming job is attempted to be performed before the embedding process, the image forming apparatus 100 may display the user-specific information input areas into which the user-specific information is not embedded to the user and determine again whether to perform the image forming job. When a user's approval is received, the image forming apparatus 100 may perform the image forming job with respect to the document in which the user-specific information is omitted. When a user's approval is not received, the image forming apparatus 100 may display the user-specific information input areas in which the user-specific information is not embedded or otherwise induce the user to embed the user-specific information.

In an example, the user-specific information may be deleted from the memory 140 in the image forming apparatus 100 when the image forming job is completed.

Figure 4:
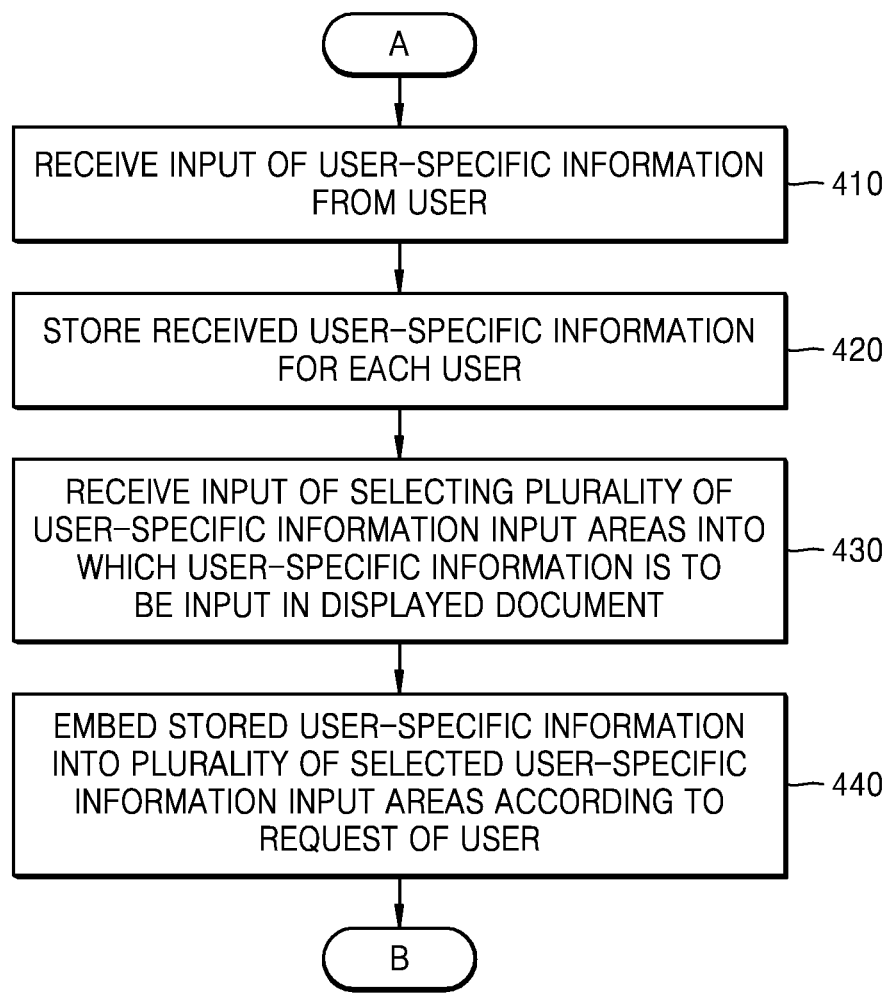
FIG. 4 is a flowchart illustrating an operation in which an image forming apparatus performs an embedding process of embedding user specific information into a plurality of user-specific information input areas included in a document, according to an example.

FIG. 4 is a flowchart illustrating an operation in which an image forming apparatus performs an embedding process of embedding user specific information into a plurality of user-specific information input areas included in a document, according to an example.

Referring to FIG. 4, the image forming apparatus 100 may receive an input of user-specific information from the user in operation 410. As an example, the image forming apparatus 100 may provide a user interface screen capable of inputting the user-specific information. The user-specific information may be input by the user through a stylus pen connected to the user interface device 120 via Bluetooth, USB, or the like. In an example, the user may select the user interface screen capable of inputting the user-specific information on the preview screen provided in the user interface device of the image forming apparatus 100.

In operation 420, the image forming apparatus 100 may store the received user-specific information for each user. The user-specific information may be stored for each user as the user-specific information is being input, when the input of the user-specific information is completed, or the like.

In operation 430, the image forming apparatus 100 may receive an input selecting a plurality of user-specific information input areas capable of inputting the user-specific information in the displayed document. The image forming apparatus 100 may designate the plurality of user-specific information input areas included in the document according to the selection by the user. For example, the user may select the user-specific information input areas or release the selected user-specific information input areas by using a management menu, such as a floating menu, a sidebar menu, or the like on the preview screen displayed in the user interface device 120.

The image forming apparatus 100 may determine whether the same portion as the designated user-specific information input areas according to the selection by the user exists in other areas in the document. When the same portion as the designated user-specific information input areas exists in other areas in the document, the image forming apparatus 100 may display the corresponding areas to be identifiable or designate the corresponding areas together.

In operation 440, the image forming apparatus 100 may embed the user-specific information stored in the image forming apparatus 100 into the plurality of user-specific information input areas selected according to a request of the user. The user may confirm the plurality of user-specific information input areas selected on the preview screen provided in the user interface device 120 and select to apply the user-specific information to be embedded such that the user-specific information may be collectively applied to the plurality of user-specific information input areas. In an example, the selection to apply the user-specific information to be embedded may be made by pressing a button, touching an icon or menu item on a touch screen, or the like.

Figure 5:
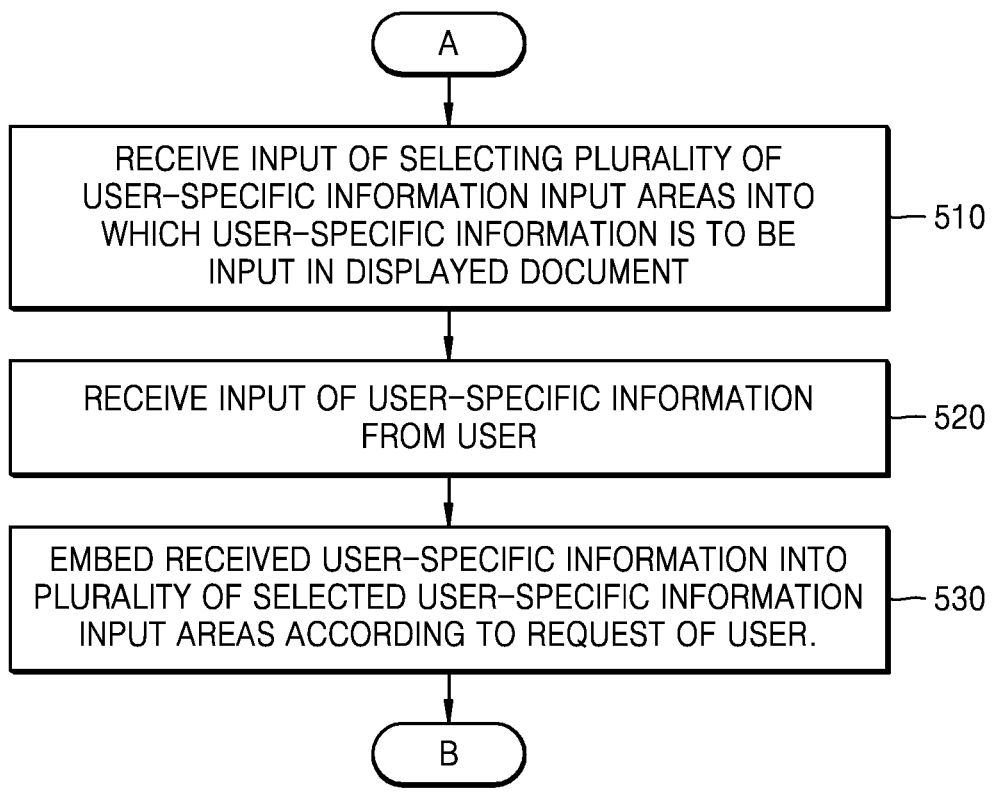
FIG. 5 is a flowchart illustrating an operation in which an image forming apparatus performs an embedding process of embedding user specific information into a plurality of user-specific information input areas included in a document, according to an example.

FIG. 5 is a flowchart illustrating an operation in which an image forming apparatus performs an embedding process of embedding user specific information into a plurality of user-specific information input areas included in a document, according to an example.

Referring to FIG. 5, the image forming apparatus 100 may receive an input selecting a plurality of user-specific information input areas capable of inputting the user-specific information in the displayed document in operation 510. The image forming apparatus 100 may designate the plurality of user-specific information input areas included in the document according to the selection by the user.

The image forming apparatus 100 may determine whether a same portion as the user-specific information input areas designated according to the selection by the user exists in other areas in the document and display the corresponding areas to be identifiable or designate the corresponding areas together.

In operation 520, the image forming apparatus 100 may receive an input of user-specific information from the user. The image forming apparatus 100 may provide a user interface screen capable of inputting the user-specific information.

In operation 530, the image forming apparatus 100 may embed the received user-specific information into the plurality of user-specific information input areas selected according to the request of the user. For example, the user may confirm the user-specific information to embed into the plurality of user-specific information input areas selected on the preview screen selected in the user interface device 120 and select to apply the user-specific information such that the received user-specific information may be collectively applied to the plurality of user-specific information input areas. In an example, the selection to apply the user-specific information may be made by pressing a button, touching an icon or menu item on a touch screen, or the like.

Figure 6:
FIG. 6 is a diagram of a user interface screen through which user-specific information may be managed, according to an example.

FIG. 6 is a diagram of a user interface screen through which user-specific information may be managed, according to an example.

Referring to FIG. 6, when the user-specific information includes a signature, a user interface screen through which a signature is managed may be provided. As illustrated in FIG. 6, the image forming apparatus 100 may receive an input of a signature for each user through the user interface screen through which the signature is managed and may store the signatures for each user when a "Save" button is pressed. In addition, the image forming apparatus 100 may delete the signature for each user when a "Delete" button is pressed after specifying a particular signature through the user interface screen through which the signature is man-aged. The image forming apparatus 100 may receive and store a signature of a new user when a "New User" button is pressed.

When an input of a signature for each user is completed, the image forming apparatus 100 may collectively apply the corresponding signatures to a plurality of signature input areas included in the document when an "Apply" button is pressed in a state in which a signature of a user is selected. When the plurality of signature input areas have different ranges, the signatures may be adjusted and applied to a range of each signature input area. In addition, when only corresponding locations are selected without specifying the ranges of the plurality of signature input areas, the signatures may be collectively applied with a fixed size.

Figure 7:
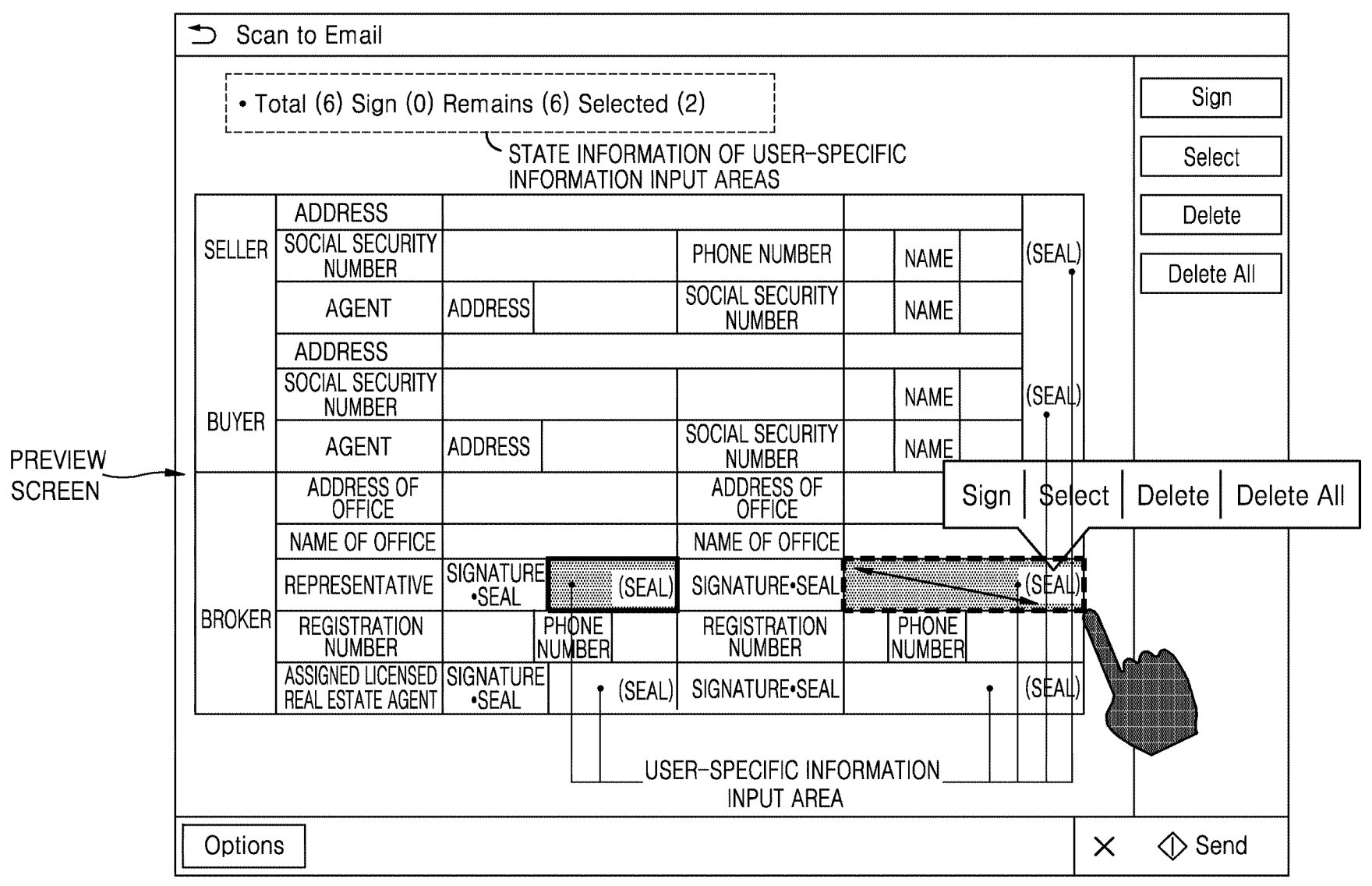

FIG. 7 is a diagram of a user interface screen through which a user-specific information input area may be selected, according to an example.

Referring to FIG. 7, when the image forming apparatus 100 provides a preview screen for an image forming job with respect to a document, such as a contract between the users, the users corresponding to a seller, a buyer, and a broker of the contract may respectively sign at various places of the document.

To this end, as shown in FIG. 7, the user interface screen through which a user-specific information input area is selected, that is, a signature input area, may be provided. As illustrated in FIG. 7, the image forming apparatus 100 may receive an input selecting a signature input area for each user through a management menu in the form of a floating menu related to the selection of the signature input area. As an example, the user may select the signature input area in a hold-and-drag manner or may select the signature input area in a tapping manner, However, examples are not limited thereto. As illustrated in FIG. 7, it may be seen that the user corresponding to the broker has selected two signature input areas in a hold-and-drag manner and no signature has yet been input. In this regard, the state information of the user-specific information input areas, that is, the state information of the signature input areas is shown at a top of the document of FIG. 7 on the preview screen. In FIG. 7, the document provided on the preview screen shows a total of six signature input areas, none of which has a signature. Also, there are six signature input areas with no signature input and two signature input areas out of the six signature input areas are shown as being selected. The total number of the signature input areas may be confirmed by determining whether a same portion as the designated signature input areas according to the selection by the user exists in other areas of the document and counting the number of areas. The state information of the signature input areas, that is, the state information of the user-specific information input areas may be adaptively changed in synchronization with selection of the user-specific information input areas or an embedding of the user-specific information.

The image forming apparatus 100 may further receive an input selecting other signature input areas and may further receive an input selecting the plurality of signature input areas when a "Select" button is pressed. In addition, the image forming apparatus 100 may release the selection of the corresponding signature input areas or delete the signatures input in the corresponding signature input areas when a "Delete" button is pressed after any signature input area is selected through the user interface screen through which the input selecting the signature input areas is received. The image forming apparatus 100 may release the selection of all the selected signature input areas when a "Delete All" button is selected. In a case where the selection of the signature input areas is completed, the image forming apparatus 100 may provide the user interface screen to manage signatures such that the signatures may be collectively applied to the selected signature input areas when a "Sign" button is selected.

FIG. 8 is a diagram of a user interface screen through which user-specific information may be embedded into a plurality of user-specific information input areas, according to an example.

Referring to FIG. 8, a user interface screen through which signatures may be embedded into the user-specific information input areas, that is, signature input areas, may be provided. As illustrated in FIG. 8, the image forming apparatus 100 may embed the signatures into the signature input areas for each user through a management menu in the form of a sidebar menu related to the selection of signature input areas and signature input buttons for each user. In the example of FIG. 8, it may be seen that the user corresponding to the broker selects four signature input areas and no signature has yet been input. In this regard, the state information of the user-specific information input areas, that is, the state information of the signature input areas is shown at a top of the document of FIG. 8 on the preview screen. In the example of FIG. 8, the document provided on the preview screen shows a total of six signature input areas, none of which has a signature. Also, there are six signature input areas into which no signature has been input and four out of six signature input areas are shown as being selected. The total number of signature input areas may be confirmed by determining whether a same portion as the designated signature input areas according to the selection of the user exists in other areas of the document and counting the number of areas. The state information of the signature input areas, that is, the state information of the user-specific information input areas may be adaptively changed in synchronization with a selection of the user-specific information input areas or an embedding of the user-specific information.

A case where the "Select" button, "Delete" button, "Delete All" button and "Sign" button included in the form of a sidebar menu in FIG. 8 are respectively selected is as described in FIG. 7. However, as shown in FIG. 8, when a signature for each user is already stored in the image forming apparatus 100, the corresponding signature may be directly embedded into the plurality of selected signature input areas by selecting a user button corresponding to the user to embed the signature, instead of selecting the "Sign" button.

Figure 9:
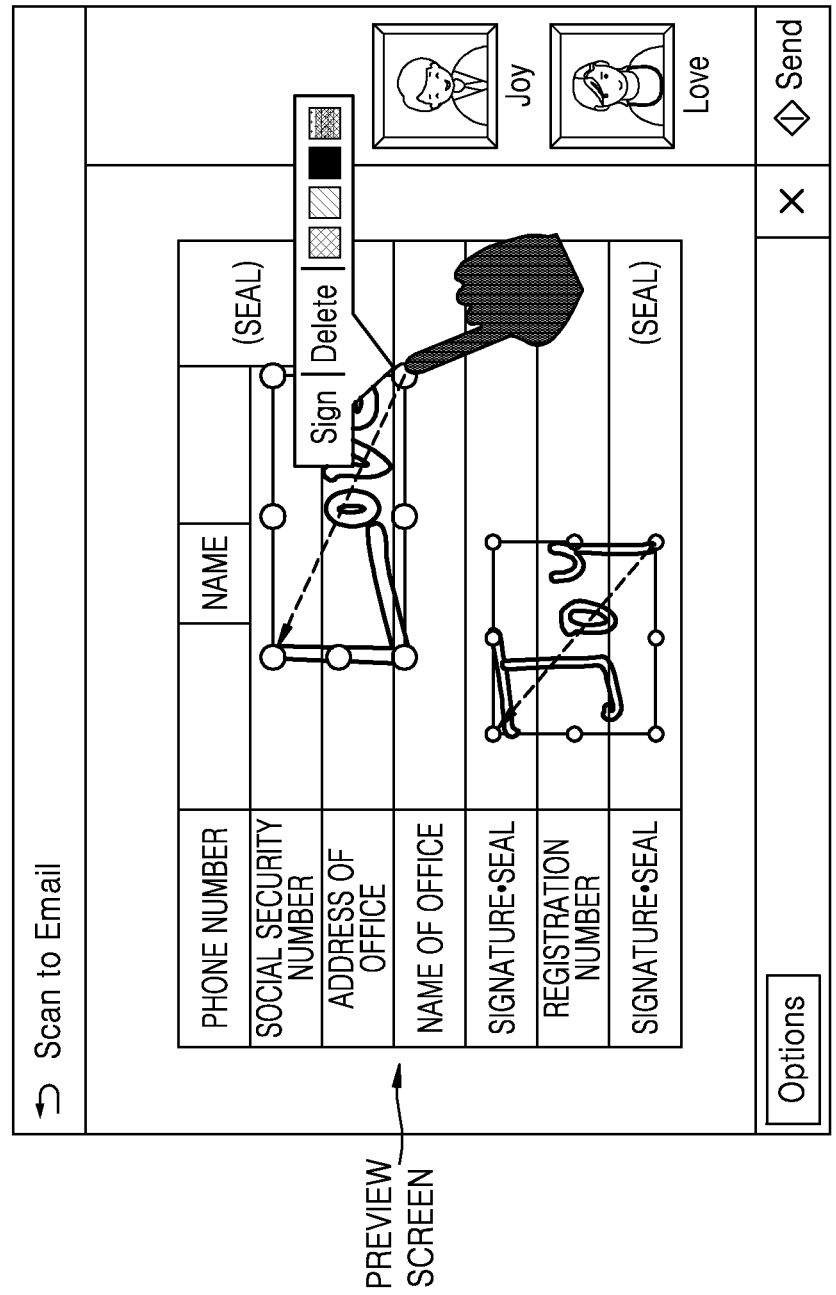
FIG. 9 is a diagram of a user interface screen through which user-specific information embedded into a plurality of user-specific information input areas may be edited, according to an example.

FIG. 9 is a diagram of a user interface screen through which user-specific information embedded into a plurality of user-specific information input areas may be edited, according to an example.

Referring to FIG. 9, the user may perform editing on the user-specific information. In an example, the editing may include deleting, color changing, position moving, size adjusting, or the like with respect to the user-specific information in the image forming apparatus 100. In the example of FIG. 9, after a signature in the signature input area is selected, the corresponding signature may be edited through a management menu in the form of a floating menu.

As illustrated in FIG. 9, the image forming apparatus 100 may change the corresponding signature when the "Sign" button is selected, and may delete the corresponding signature when the "Delete" button is selected. In addition, a color of the corresponding signature may be changed when a "color" button represented by various colors is selected. In addition, the image forming apparatus 100 may move a location of the signature embedded into the signature input area in a drag-and-drop manner or adjust a size of the signature in a hold-and-drag manner. In a case where signatures are edited when a plurality of signatures are selected, all of the plurality of signatures may be equally edited based on a same direction, a same distance, a same ratio, a same color, or the like.

Figure 10:
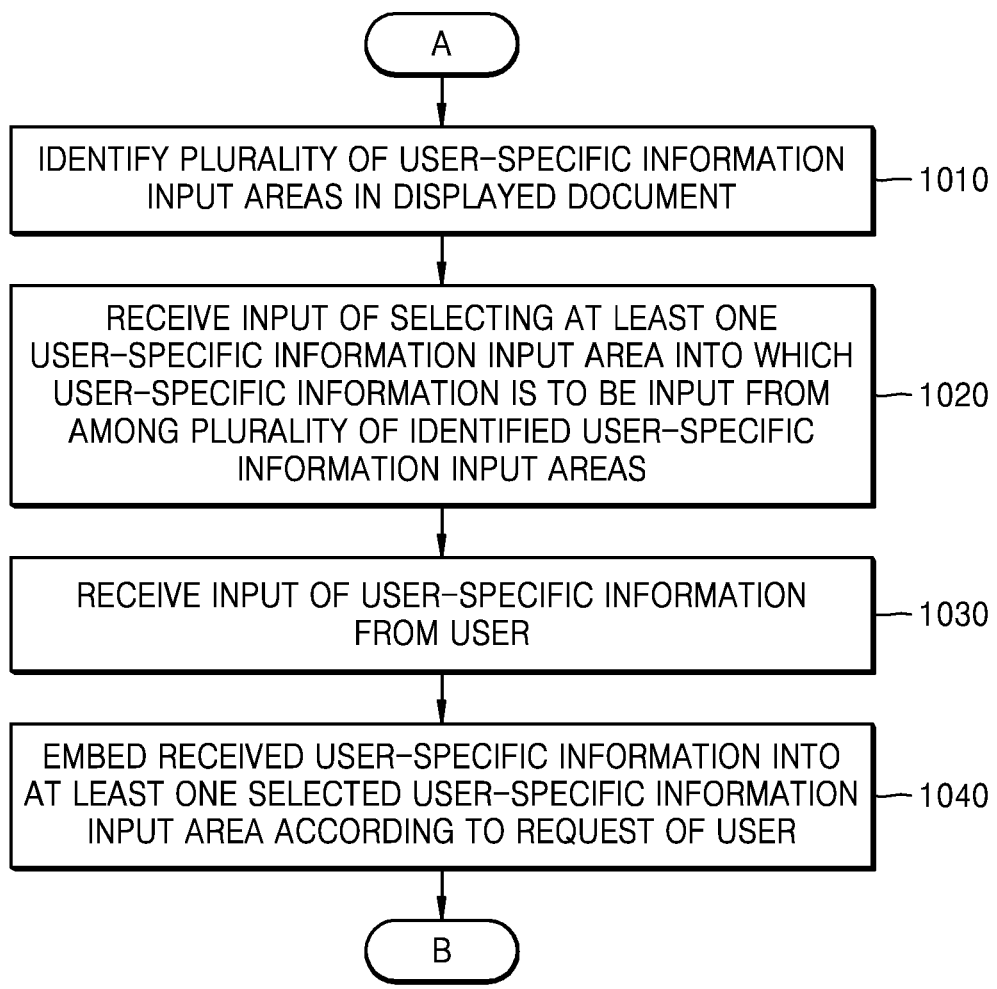
FIG. 10 is a flowchart illustrating an operation in which an image forming apparatus performs an embedding process of embedding user specific information into a plurality of user-specific information input areas included in a document, according to an example.

FIG. 10 is a flowchart illustrating an operation in which an image forming apparatus performs an embedding process of embedding user-specific information into a plurality of user-specific information input areas included in a document, according to an example.

Referring to FIG. 10, the image forming apparatus 100 may identify a plurality of user-specific information input areas in a displayed document in operation 1010. In an example, the image forming apparatus 100 may utilize OCR or ICR technology for automatic identification of the plurality user-specific information input areas. The image forming apparatus 100 may identify the user-specific information input areas by utilizing the OCR or ICR technology and may select a special letter, a special character, a symbol, or the like corresponding to the user-specific information input areas.

In operation 1020, the image forming apparatus 100 may receive an input selecting at least one user-specific information input area to be input with user-specific information among the plurality of identified user-specific information input areas. The image forming apparatus 100 may designate the plurality of user-specific information input areas included in the document according to the selection by the user.

In operation 1030, the image forming apparatus 100 may receive an input of user-specific information from the user. The image forming apparatus 100 may provide a user interface screen capable of receiving an input of the user-specific information.

In operation 1040, the image forming apparatus 100 may embed the received user-specific information into at least one selected user-specific information input area according to the request of the user. For example, the user may confirm the user-specific information to be embedded into the plurality of user-specific information input areas selected on the preview screen selected in the user interface device 120 and may select application of the user-specific information such that the received user-specific information may be collectively applied to the plurality of user-specific information input areas. In an example, the selection to apply the user-specific information to be embedded may be made by pressing a button, touching an icon or menu item on a touch screen, or the like.

Figure 11:
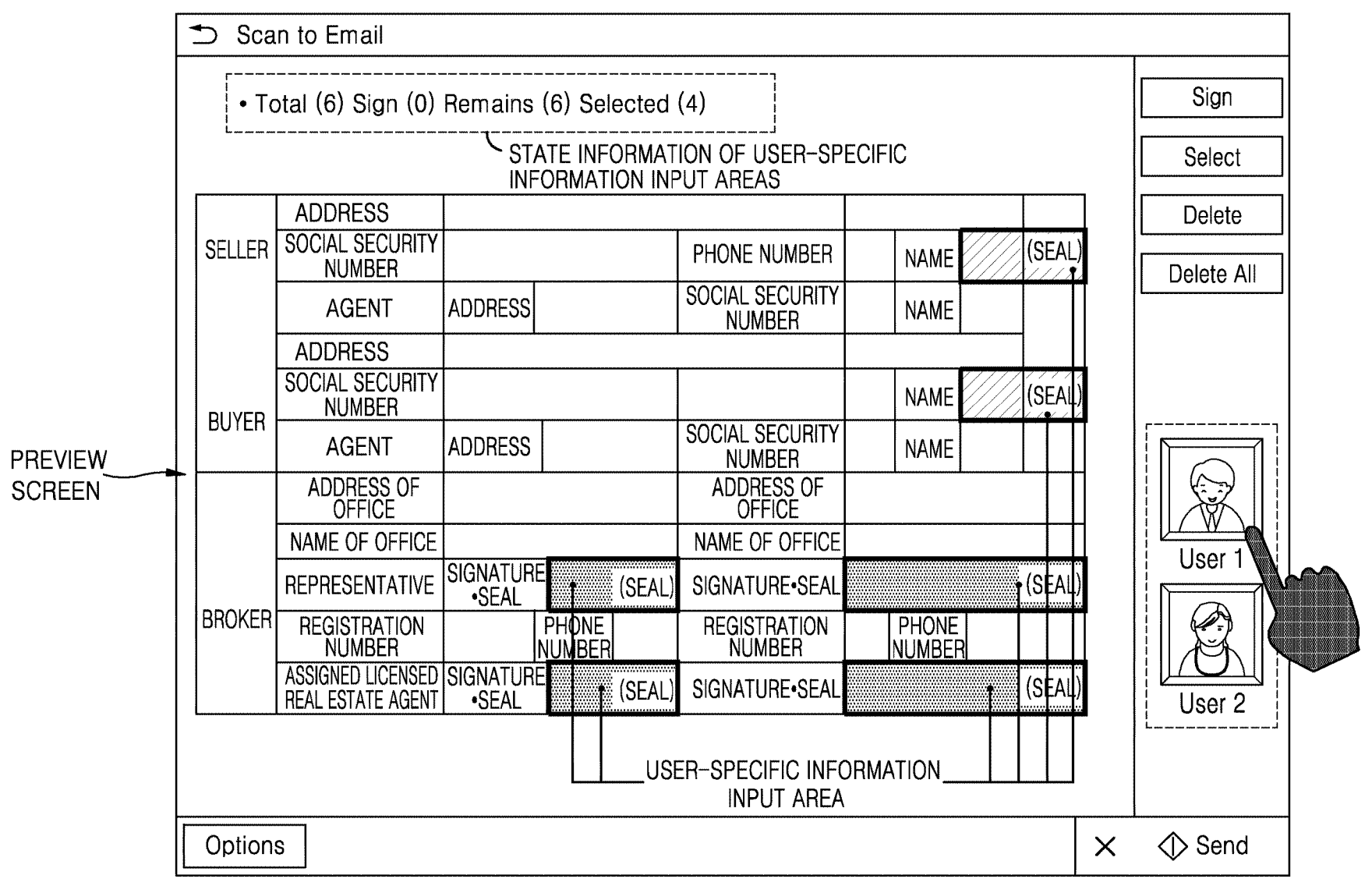

FIG. 11 is a diagram of a user interface screen through which user-specific information may be embedded into a plurality of user-specific information input areas, according to an example.

Referring to FIG. 11, a user interface screen through which signatures may be embedded into user-specific information input areas, that is, signature input areas, may be provided. In the example of FIG. 11, the image forming apparatus 100 may embed the signatures into the signature input areas for each user through a management menu in the form of a sidebar menu related to the selection of signature input areas and signature input buttons (e.g., icons, etc.) for each user.

As illustrated in FIG. 11, the image forming apparatus 100 may identify a plurality of signature input areas in a document displayed on the preview screen of the user interface device 120. The OCR or the ICR technology may be used to perform automatic identification of the plurality of user-specific information input areas. Accordingly, the user may identify the plurality of identified signature input areas, and the plurality of identified signature input areas may be displayed with generated identification marks that are displayed in a color distinguishable from other areas, may be displayed in a blinking manner, or the like. The image forming apparatus 100 may receive an input selecting at least one signature input area among the plurality of identified signature input areas. In the example of FIG. 11, it may be seen that the user corresponding to the broker selected four signature input areas to which the broker's signature should be embedded among six identified signature input areas, but no signature has yet been input. In this regard, the state information of the user-specific information input areas, that is, the state information of the signature input areas is shown at a top of the document of FIG. 11 on the preview screen. In the example of FIG. 11, the document displayed on the preview screen shows that there are a total of six signature input areas, none of the six signature input areas has a signature, there are six areas in which no signature is input, and four out of the six signature input areas are selected. The state information of the signature input areas, that is, the state information of the user-specific information input areas may be adaptively changed in synchronization with selection of the user-specific information input areas or embedding of the user-specific information.

A case where the "Select" button, "Delete" button, "Delete All" button and "Sign" button included in the form of a sidebar menu in FIG. 11 are respectively selected is as described in FIG. 7. However, as shown in FIG. 11, when a signature for each user is already stored in the image forming apparatus 100, the corresponding signature may be directly embedded into the plurality of selected signature input areas by selecting a user button corresponding to the user to embed the signature, instead of selecting the "Sign" button.

The above-mentioned examples of operating the image forming apparatus 100 may be implemented in the form of a non-transitory computer-readable storage medium storing instructions or data executable by a computer or a processor. The examples may be written as computer programs and may be implemented in general-use digital computers that execute the programs by using a non-transitory computer-readable storage medium. Examples of the non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disk, solid-status disk (SSD), and instructions or software, associated data, data files, and data structures, and any device capable of providing instructions or software, associated data, data files, and data structures to a processor or a computer such that the processor or computer may execute instructions.

What is claimed is:

1. An image forming apparatus comprising:
a user interface device; an image forming job operator;
a processor; and
a memory storing instructions executable by the processor, wherein the processor executes the instructions to:
display a preview screen of a document through the user interface device, perform an embedding process to embed user-specific information into a plurality of user-specific information input areas included in the document, display state information of the plurality of user-specific information input areas on the preview screen in synchronization with a progress of the embedding process, and based on completion of the embedding process, perform an image forming job with respect to the document in which the user-specific information is embedded, through the image forming job operator, wherein the state information of the plurality of user-specific information input areas includes at least one of a numeric value corresponding to a total number of the plurality of user-specific information input areas, a numeric value corresponding to a number of the user-specific information input areas selected by the user, or a numeric value corresponding to a number of user-specific information input areas into which the user-specific information is embedded.

2. The image forming apparatus of claim 1, wherein the state information of the plurality of user-specific information input areas is adaptively changed in synchronization with selection of the user-specific information input areas or an embedding of the user-specific information.

3. The image forming apparatus of claim 1, wherein the processor executes the instructions to:
receive, from a user, an input of the user-specific information,
store the received user-specific information,
receive an input selecting the plurality of user-specific information input areas into which the user-specific information is to be input, and
embed the stored user-specific information into the plurality of selected user-specific information input areas according to a request of the user.

4. The image forming apparatus of claim 1, wherein the processor executes the instructions to:
receive an input selecting the plurality of user-specific information input areas into which the user-specific information is to be input,
receive, from a user, an input of the user-specific information, and
embed the received user-specific information into the plurality of selected user-specific information input areas according to a request of a user.

5. The image forming apparatus of claim 1, wherein the processor executes the instructions to:
identify the plurality of user-specific information input areas included in the document,
receive an input selecting at least one user-specific information input area into which the user-specific information is to be input from among the plurality of identified user-specific information input areas,
receive an input of the user-specific information from a user, and
embed the received user-specific information into the at least one selected user-specific information input area according to a request of the user.

6. The image forming apparatus of claim 1, wherein the processor executes the instructions to edit, on the preview screen, the user-specific information embedded into the plurality of user-specific information input areas.

7. The image forming apparatus of claim 1, wherein the user-specific information is stored for each user in the memory during the embedding process, and, based on completion of the image forming job, the user-specific information is deleted from the memory.

8. An operation method of an image forming apparatus, the operation method comprising: displaying a preview screen of a document in a user interface device of an image forming apparatus; performing an embedding process of embedding user-specific information into a plurality of user-specific information input areas included in the document; displaying state information of the plurality of user-specific information input areas on the preview screen in synchronization with a progress of the embedding process; and based on completion of the embedding process, performing an image forming job with respect to the document in which the user-specific information is input, wherein the state information of the plurality of user-specific information input areas includes at least one of a numeric value corresponding to a total number of the plurality of user-specific information input areas, a numeric value corresponding to a number of the user-specific information input areas selected by the user, or a numeric value corresponding to a number of user-specific information input areas into which the user-specific information is embedded.

9. The operation method of claim 8, wherein the state information of the plurality of user-specific information input areas is adaptively changed in synchronization with selection of the user-specific information input areas or an embedding of the user-specific information.

10. The operation method of claim 8, wherein the performing of the embedding process comprises:
receiving an input of the user-specific information from a user;
storing the received user-specific information for each user;
receiving an input selecting the plurality of user-specific information input areas into which the user-specific information is to be input; and
embedding the stored user-specific information into the plurality of selected user-specific information input areas according to a request of the user.

11. The operation method of claim 8, wherein the performing of the embedding process comprises:
receiving an input selecting the plurality of user-specific information input areas into which the user-specific information is to be input;
receiving an input of the user-specific information from a user; and
embedding the received user-specific information into the plurality of selected user-specific information input areas according to a request of the user.

12. The operation method of claim 8, wherein the performing of the embedding process comprises:
identifying the plurality of user-specific information input areas included in the document;
receiving an input selecting at least one user-specific information input area into which the user-specific information is to be input from among the plurality of identified user-specific information input areas;
receiving an input of the user-specific information from a user; and
embedding the received user-specific information into the at least one selected user-specific information input area according to a request of the user.

13. The operation method of claim 8, wherein the performing of the embedding process further comprises editing, on the preview screen, the user-specific information embedded into the plurality of user-specific information input areas.

14. The operation method of claim 8, further comprising:
storing the user-specific information for each user in a memory during the embedding process; and
based on completion of the image forming job, deleting the user-specific information from the memory.

15. A non-transitory computer-readable storage medium storing instructions executable by a processor, the non-transitory computer-readable storage medium comprising:
instructions to display a preview screen of a document in a user interface device of an image forming apparatus;
instructions to perform an embedding process to embed user-specific information into a plurality of user-specific information input areas included in the document;
instructions to display state information of the plurality of user-specific information input areas on the preview screen in synchronization with a progress of the embedding process; and
instructions to perform an image forming job with respect to the document in which the user-specific information is input based on completion of the embedding process, wherein the state information of the plurality of user-specific information input areas includes at least one of a numeric value corresponding to a total number of the plurality of user-specific information input areas, a numeric value corresponding to a number of the user-specific information input areas selected by the user, or a numeric value corresponding to a number of user-specific information input areas into which the user-specific information is embedded.

16. The non-transitory computer-readable storage medium of claim 15, further comprising instructions to adaptively change the state information of the plurality of user-specific information input areas in synchronization with selection of a user-specific information input areas or an embedding of the user-specific information.

17. The non-transitory computer-readable storage medium of claim 15, further comprising:
instructions to receive, from a user, an input of the user-specific information;
instructions to store the received user-specific information;
instructions to receive an input selecting the plurality of user-specific information input areas into which the user-specific information is to be input; and
instructions to embed the stored user-specific information into the plurality of user-specific information input areas according to a request of the user.

18. The non-transitory computer-readable storage medium of claim 15, wherein the state information is to be displayed above the user-specific information input areas.

19. The image forming apparatus of claim 1, wherein the state information is to be displayed above the user-specific information input areas.

20. The operation method of claim 8, wherein the state information is to be displayed above the user-specific information input areas.

* * * * *